United States Patent
Blackwood et al.

(10) Patent No.: US 8,372,497 B2
(45) Date of Patent: Feb. 12, 2013

(54) SILICONE COATINGS ON AIR BAGS

(75) Inventors: William Blackwood, Midland, MI (US); Robert Alan Ekeland, Greer, SC (US); Randall Paul Sweet, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 13/519,868

(22) PCT Filed: Dec. 27, 2010

(86) PCT No.: PCT/US2010/062152
§ 371 (c)(1), (2), (4) Date: Jun. 28, 2012

(87) PCT Pub. No.: WO2011/082136
PCT Pub. Date: Jul. 7, 2011

(65) Prior Publication Data
US 2012/0301644 A1    Nov. 29, 2012

Related U.S. Application Data

(60) Provisional application No. 61/290,931, filed on Dec. 30, 2009.

(51) Int. Cl.
| B29D 22/00 | (2006.01) |
| B29D 23/00 | (2006.01) |
| B32B 1/08 | (2006.01) |
| B60R 21/16 | (2006.01) |

(52) U.S. Cl. ...... 428/36.1; 428/35.7; 428/447; 428/452; 280/728.1; 427/394

(58) Field of Classification Search ............... 428/36.1, 428/35.7, 447, 452; 427/394; 280/728.1
See application file for complete search history.

(56) References Cited

U.S. PATENT DOCUMENTS

| 5,563,211 A | 10/1996 | Kosal et al. |
| 5,854,310 A | 12/1998 | Maxson |

(Continued)

FOREIGN PATENT DOCUMENTS

| EP | 0903379 A2 | 3/1999 |
| EP | 1108764 A2 | 6/2001 |

(Continued)

OTHER PUBLICATIONS

English language abstract for FR 2765884 extracted from the espacenet.com database on Sep. 5, 2012, 30 pages.

(Continued)

*Primary Examiner* — Michael C Miggins
(74) *Attorney, Agent, or Firm* — Howard & Howard Attorneys PLLC

(57) ABSTRACT

Air bags which are used for safety purposes to protect occupants of vehicles such as automobiles are described together with a process for coating air bags and air bag fabrics with silicone rubber compositions. In particular the invention relates to silicone rubber coatings which cure by hydrosilylation and an air bag coated with an elastomeric coating which is the cured product of a silicone composition comprising an organopolysiloxane (A) having aliphatically unsaturated hydrocarbon or hydrocarbonoxy substituents, an organosilicon crosslinker having at least 3 silicon-bonded hydrogen atoms, a catalyst able to promote the reaction of the aliphatically unsaturated hydrocarbon or hydrocarbonoxy substituents with Si—H groups and a reinforcing filler, wherein the organopolysiloxane (A) comprises a branched organopolysiloxane (A1) consisting of: (i) one or more Q units of the formula ($SiO_{4/2}$) and (ii) from 15 to 8000 D units of the formula $Rb^2SiO_{2/2}$ which units (i) and (ii) may be inter-linked in any appropriate combination, and (iv) M units of the formula $R^a R^b{}_2 SiO_{1/2}$ wherein each $R^a$ substituent is selected from the group consisting of an alkyl group having from 1 to 6 carbon atoms, an alkenyl group having from 1 to 6 carbon atoms and an alkynyl group having from 1 to 6 carbon atoms, at least three $R^a$ substituents in the branched siloxane being alkenyl or alkynyl units, and each $R^b$ substituent is selected from the group consisting of an alkyl group having from 1 to 6 carbon atoms, an alkenyl group having 2 to 6 carbon atoms, an aryl group, an alkoxy group, an acrylate group and a methacrylate group.

17 Claims, 2 Drawing Sheets

U.S. PATENT DOCUMENTS

Figure 1:
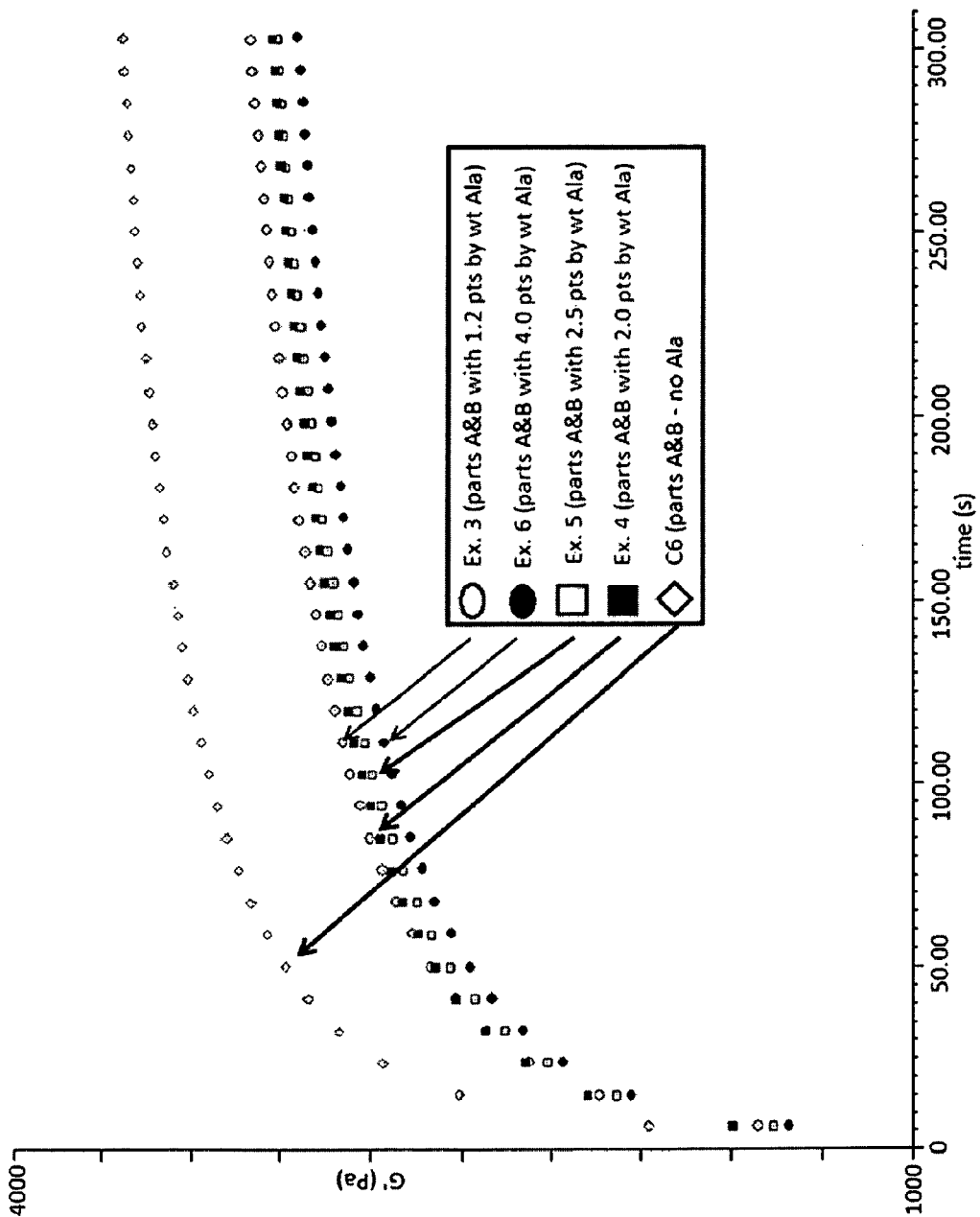

| | | |
|---|---|---|
| 6,425,600 B1 | 7/2002 | Fujiki et al. |
| 6,511,754 B1 | 1/2003 | Bohin et al. |
| 6,562,737 B1 | 5/2003 | Bohin et al. |
| 6,709,752 B1 | 3/2004 | James et al. |
| 6,806,339 B2 | 10/2004 | Cray et al. |
| 2002/0061998 A1 | 5/2002 | Cray et al. |
| 2008/0003370 A1 | 1/2008 | Sweet et al. |
| 2009/0298367 A1 | 12/2009 | Lafaysse et al. |
| 2010/0190395 A1 | 7/2010 | Nozoe et al. |
| 2010/0190396 A1 | 7/2010 | Nozoe et al. |

FOREIGN PATENT DOCUMENTS

| | | |
|---|---|---|
| EP | 2053160 A1 | 4/2009 |
| EP | 2053161 A1 | 4/2009 |
| FR | 2765884 A1 | 1/1999 |
| FR | 2894997 A1 | 6/2007 |
| WO | WO 2008/020605 A1 | 2/2008 |
| WO | WO 2008/020635 A1 | 2/2008 |
| WO | WO 2010/078235 A1 | 7/2010 |
| WO | WO 2011/082134 A1 | 7/2011 |

OTHER PUBLICATIONS

English language abstract for FR 2894997 extracted from the espacenet.com database on Sep. 5, 2012, 35 pages.

English language abstract for WO 2008/020605 extracted from the espacenet.com database on Sep. 5, 2012, 26 pages.

English language abstract for WO 2008/020635 extracted from the espacenet.com database on Sep. 5, 2012, 28 pages.

International Search Report for Application No. PCT/US2010/062152 dated Mar. 3, 2011, 4 pages.

International Search Report for Application No. PCT/US2010/062149 dated Feb. 17, 2011, 4 pages.

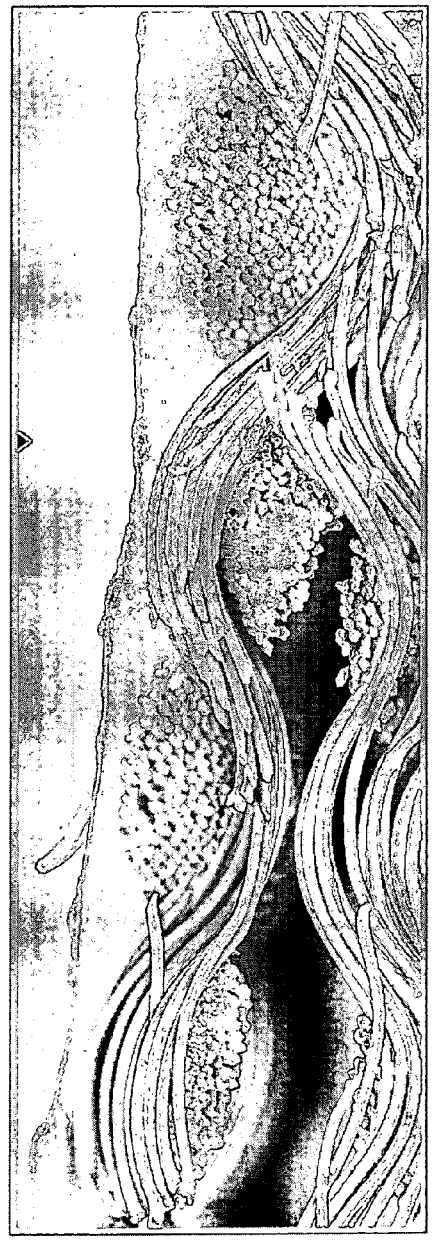
Figure 2a
Figure 2b

SILICONE COATINGS ON AIR BAGS

RELATED APPLICATIONS

This application is the National Stage of International Patent Application No. PCT/US2010/062152, filed on Dec. 27, 2010, which claims priority to and all the advantages of U.S. Provisional Patent Application No. 61/290,931, filed on Dec. 30, 2009.

This invention relates to air bags coated with silicone rubber compositions. Air bags are used for safety purposes to protect occupants of vehicles such as automobiles. The invention also relates to a process for coating air bags and air bag fabrics with silicone rubber compositions. In particular the invention relates to silicone rubber coatings which cure by hydrosilylation, that is by the reaction of alkenyl groups of one polyorganosiloxane and Si-bonded hydrogen groups of another polyorganosiloxane.

Air bags are generally formed from a woven or knitted fabric made of synthetic fibre, for example of polyamide such as nylon-6,6 or polyester, covered on at least one of its sides with a layer of an elastomer. Air bags may be made of flat fabric pieces which are coated and then sewn together to provide sufficient mechanical strength, or may be woven in one piece with integrally woven seams. Sewn air bags are generally assembled with the coated fabric surface at the inside of the air bag. One piece woven air bags are coated on the outside of the air bag.

For some airbag applications, pressurised gas has to be retained in a fabric envelope for a relatively long period. This requirement exists for example in side curtain airbags for the automotive industry. These side curtain airbags are intended to inflate at the time of impact, as do conventional airbags. The side curtains unfold to form a cushioned curtain between passengers and some of the side of the car body, e.g., the windows. As the intention is not merely to cushion the blow on impact itself, as is the case for conventional driver and passenger airbags, but to protect passengers e.g. when a car is rolling, it is important that the side curtain air bag is sufficiently pressurised during such rolling process. Where conventional driver and passenger airbags only need to retain pressure for a fraction of a second, it is desirable that side curtain airbags maintain a suitable pressure for a few seconds. Similar applications exist where a pressurised fabric structure is desired to maintain a certain gas pressure for a relatively extended period of time, e.g. in emergency chutes for aeroplanes, or inflatable rafts. There is thus a demand for coated fabrics having the benefits of flexibility and high temperature resistance at low coating weight given by silicone rubber coatings, but with improved air tightness.

Use of silicone rubber as the elastomer coating on the air bag base fabric provides excellent high-temperature properties, in addition to which the ability to coat the base fabric with a thin film of silicone rubber, for example 15 to 50 g/m$^2$, makes it possible to achieve a lightweight construction. It is however difficult to ensure sufficient air tightness (i.e. low enough gas permeability of the coated fabric) at low coating weights. Air tightness is a particular problem with one piece woven air bags. Moreover, air bag manufacturers wish to move to one piece woven air bags of lower fabric weights and looser weave construction, increasing the challenge of ensuring air tightness at low coating weights.

Silicone rubber air bag coatings are disclosed in many patents. For example U.S. Pat. No. 6,709,752 discloses a composition for coating textile fabrics which is hydrosilylation reaction-curable and comprises of polyorganosiloxanes of three types, two of which are alkenyl-terminated polyorganosiloxanes having two different specific viscosities and the third having alkenyl groups on molecular terminals and in side chains, an organosilicon crosslinker having at least 3 silicon-bonded hydrogen atoms, a catalyst and a reinforcing filler.

U.S. Pat. No. 6,425,600 describes a silicone rubber composition for coating air bags comprising an organopolysiloxane having at least two silicon-bonded alkenyl groups per molecule, finely divided silica, an adhesive component, a silicone-soluble resin bearing at least one alkenyl group per molecule, an organohydrogenpolysiloxane, and a platinum group catalyst.

WO-A-08/020,605 describes a silicone-rubber composition for coating textile fabrics comprising the following components: an alkenyl group-containing organopolysiloxane (A) that comprises a mixture of an organopolysiloxane (A-1) that contains no more than 2% alkenyl groups and an organopolysiloxane (A-2) that contains 5% or more alkenyl groups, A-2 being present at no more than 1% by weight based on A-1; an organohydrogenpolysiloxane (B) that comprises a mixture of an organohydrogenpolysiloxane (B-1) that has on average three silicon-bonded hydrogen atoms per molecule and an organohydrogenpolysiloxane (B-2) that has on average two silicon-bonded hydrogen atoms per molecule; a hydrosilylation catalyst (C); and a reinforcement fine silica powder (D).

U.S. Pat. No. 6,511,754 describes a coating composition comprising at least one polyorganosiloxane having, per molecule, at least two C2-C6 alkenyl groups linked to the silicon, at least one polyorganosiloxane having, per molecule, at least two hydrogen atoms linked to the silicon, a catalyst based on a metal belonging to the platinum group, a reinforcing siliceous filler treated in situ by a compatibilizer in the presence of the alkenyl-functional polyorganosiloxane, a polyorganosiloxane termed an extender and having terminal siloxyl units with hydrogen functional groups, and a ternary adhesion promoter comprising at least one possibly alkoxylated organosilane containing at least one C3-C6 alkenyl group, at least one organosilicon compound which includes at least one epoxy radical, and a metal chelate and/or metal alkoxide.

WO-A-08/020,635 describes a silicone-rubber composition for coating fabric comprising an alkenyl-containing organopolysiloxane, an organohydrogenpolysiloxane, a hydrosilylation catalyst, a finely powdered reinforcing silica, a methacryl- or acryl-containing alkoxysilane, and a zirconium chelate compound.

In a process according to the invention for coating an air bag or an air bag fabric with a silicone composition curable to an elastomeric finish in which the silicone composition comprises an organopolysiloxane (A) having aliphatically unsaturated hydrocarbon or hydrocarbonoxy substituents, an organosilicon crosslinker having at least 3 silicon-bonded hydrogen atoms, a catalyst able to promote the reaction of the aliphatically unsaturated hydrocarbon or hydrocarbonoxy substituents with Si—H groups and a reinforcing filler, the organopolysiloxane (A) comprises a branched organopolysiloxane (A1) consisting of:

(i) one or more Q units of the formula ($SiO_{4/2}$) and (ii) from 15 to 6000 D units of the formula $R^b{}_2SiO_{2/2}$ which units (i) and (ii) may be inter-linked in any appropriate combination, and (iii) M units of the formula $R^aR^b{}_2SiO_{1/2}$, wherein each $R^a$ substituent is selected from the group consisting of an alkyl group having from 1 to 6 carbon atoms, an alkenyl group having from 1 to 6 carbon atoms and an alkynyl group having from 1 to 6 carbon atoms, at least three $R^a$ substituents in the branched siloxane being alkenyl or alkynyl units, and each $R^b$ substituent is selected from the group consisting of an alkyl group having from 1 to 6 carbon atoms, an alkenyl group having 2 to 6 carbon atoms, an aryl group, an alkoxy group, an acrylate group and a methacrylate group.

The invention includes an air bag coated with an elastomeric coating which is the cured product of a silicone composition comprising an organopolysiloxane (A) having aliphatically unsaturated hydrocarbon or hydrocarbonoxy substituents, an organosilicon crosslinker having at least 3 silicon-bonded hydrogen atoms, a catalyst able to promote the reaction of the aliphatically unsaturated hydrocarbon or hydrocarbonoxy substituents with Si—H groups and a reinforcing filler, wherein the organopolysiloxane (A) comprises a branched organopolysiloxane (A1) as defined above.

The invention also includes an air bag fabric coated with a silicone composition curable to an elastomeric finish in which the silicone composition comprises an organopolysiloxane (A) having aliphatically unsaturated hydrocarbon or hydrocarbonoxy substituents, an organosilicon crosslinker having at least 3 silicon-bonded hydrogen atoms, a catalyst able to promote the reaction of the aliphatically unsaturated hydrocarbon or hydrocarbonoxy substituents with Si—H groups and a reinforcing filler, wherein the organopolysiloxane (A) comprises a branched organopolysiloxane (A1) as defined above.

The invention further includes the use of a branched organopolysiloxane (A1) consisting of:
(i) one or more Q units of the formula $(SiO_{4/2})$ and
(ii) from 15 to 6000 D units of the formula $R^b{}_2SiO_{2/2}$ which units (1) and (ii) may be inter-linked in any appropriate combination, and
(iii) M units of the formula $R^aR^b{}_2SiO_{1/2}$, wherein each $R^a$ substituent is selected from the group consisting of an alkyl group having from 1 to 6 carbon atoms, an alkenyl group having from 1 to 6 carbon atoms and an alkynyl group having from 1 to 6 carbon atoms, at least three $R^a$ substituents in the branched siloxane being alkenyl or alkynyl units, and each $R^b$ substituent is selected from the group consisting of an alkyl group having from 1 to 6 carbon atoms, an alkenyl group having 2 to 6 carbon atoms, an aryl group, an alkoxy group, an acrylate group and a methacrylate group, as all or part of the organopolysiloxane (A) in an air bag coating comprising an organopolysiloxane (A) having aliphatically unsaturated hydrocarbon or hydrocarbonoxy substituents, an organosilicon crosslinker having at least 3 silicon-bonded hydrogen atoms, a catalyst able to promote the reaction of the aliphatically unsaturated hydrocarbon or hydrocarbonoxy substituents with Si—H groups, and a reinforcing filler.

The branched organopolysiloxane (A1) has at least one $SiO_{4/2}$ unit (Q unit) and may on average have any whole number or fraction of $SiO_{4/2}$ units greater than one, for example it may have from two to four $SiO_{4/2}$ units.

The branched organopolysiloxane (A1) also contains from 15 to 6000 D units of the formula $R^b{}_2SiO_{2/2}$. Each group $R^b$ is preferably an alkyl group, for example methyl, ethyl, propyl, iso-propyl, butyl or iso-butyl. Most preferably all the groups $R^b$ are methyl groups.

The branched organopolysiloxane (A1) may include at least one $R^b{}_2SiO_{2/2}$ unit bonded to each of the more than one $SiO_{4/2}$ units. Preferably, the branched organopolysiloxane (A1) has four blocks of $(CH_3)_2SiO_{2/2}$ units bonded to the or each $SiO_{4/2}$ unit. The blocks of $(CH_3)_2SiO_{2/2}$ units may include from 20 to 400 individual $(CH_3)_2SiO_{2/2}$ units, but are not limited to this range. Typically, the branched organopolysiloxane (A1) has four blocks of from 120 to 400 $(CH_3)_2SiO_{2/2}$ units bonded to each $SiO_{4/2}$ unit such that the branched organopolysiloxane (A1) has a total from 480 to 5,000 $(CH_3)_2SiO_{2/2}$ units. For descriptive purposes only, a chemical structure of chains of $(CH_3)_2SiO_{2/2}$ units bonded to a $SiO_{4/2}$ unit are shown below wherein n is a number from 20 to 400 (each n may be the same or different):

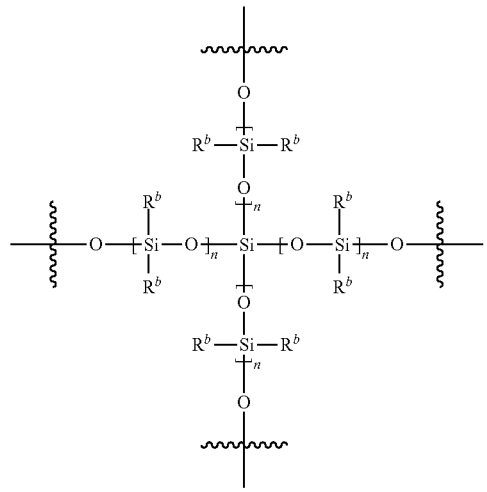

The branched organopolysiloxane (A1) also includes $R^aR^b{}_2SiO_{1/2}$ units (M units). $R^b$ is the same as $R^b$ described above, and is preferably methyl. $R^a$ is preferably selected from the group of an alkyl moiety having from 1 to 6 carbon atoms, an alkenyl moiety having from 1 to 6 carbon atoms, and an alkynyl moiety having from 1 to 6 carbon atoms. Preferably at least 50% of $R^a$ substituents are alkenyl groups. Most preferably each $R^a$ substituent is an alkenyl group. Each alkenyl group may for example be selected from vinyl, allyl, butenyl, pentenyl and hexenyl groups but is preferably selected from vinyl and hexenyl and is most preferably vinyl. Each $R^aR^b{}_2SiO_{1/2}$ unit is preferably bonded to a $R^b{}_2SiO_{2/2}$ unit thereby capping the branched organopolysiloxane (A1) with functionalized end groups. A chemical structure representative of this arrangement is shown below:

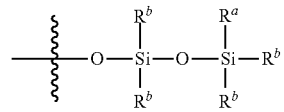

The branched organopolysiloxane (A1) can have an alkenyl, for example vinyl, group content between 0.025 and 10% by weight, depending mainly on the ratio of alkenyl-containing $R^aR^b{}_2SiO_{1/2}$ units to $R^b{}_2SiO_{2/2}$ units in the branched organopolysiloxane (A1).

The branched organopolysiloxane (A1) comprises a polymerization product of a siloxane resin and a cyclic polysiloxane. The siloxane resin is preferably polymerized with the cyclic polysiloxane in a weight ratio from 0.2:99.8 to 4:96. The siloxane resin is an MQ resin of the empirical formula $(SiO_{4/2})(R^aR^b{}_2SiO_{1/2})_x$ where x preferably has a value in the range 1.05 to 4. The cyclic polysiloxane is generally a polydialkylsiloxane ring consisting of from 3 to 6 repeating $R^b{}_2SiO_{2/2}$ units, preferably in which each $R^b$ substituent is a methyl group, for example octamethylcyclotetrasiloxane and/or decamethylcyclopentasiloxane. The siloxane resin and cyclic polysiloxane are reacted in the presence of a catalyst for siloxane ring opening, preferably a phosphazene base catalyst as described in U.S. Pat. No. 6,806,339.

The branched organopolysiloxane (A) can be used as all or part of the organopolysiloxane (A) having aliphatically unsaturated hydrocarbon or hydrocarbonoxy substituents. Preferably the branched organopolysiloxane (A1) only forms part of the organopolysiloxane (A). The branched organopolysiloxane (A1) can for example comprise 0.2 to 50% by weight of the organopolysiloxane (A). It is preferred that the major part of organopolysiloxane (A) has a predominantly linear molecular structure.

The total organopolysiloxane (A) in the coating composition generally contains less than 5% and preferably less than 3% by weight alkenyl groups. The total organopolysiloxane (A) preferably contains 0.02% to 2% by weight alkenyl groups.

The alkenyl groups of the predominantly linear organopolysiloxane (A) can be exemplified by vinyl, allyl, butenyl, pentenyl, hexenyl, and heptenyl groups, of which vinyl groups are preferred. Silicon-bonded organic groups other than alkenyl groups contained in organopolysiloxane (A) may be exemplified by methyl, ethyl, propyl, butyl, pentyl, hexyl, or similar alkyl groups; phenyl, tolyl, xylyl, or similar aryl groups; or 3-chloropropyl, 3,3,3-trifluoropropyl, or similar halogen-substituted groups. Preferably, the groups other than alkenyl groups are methyl groups and optionally phenyl groups.

The predominantly linear organopolysiloxane (A) can for example comprise an α,ω-vinyldimethylsiloxy polydimethylsiloxane, an α,ω-vinyldimethylsiloxy copolymer of methylvinylsiloxane and dimethylsiloxane units, and/or an α,ω-trimethylsiloxy copolymer of methylvinylsiloxane and dimethylsiloxane units. The polyorganosiloxane (A) preferably has a viscosity of at least 100 mPa·s at 25° C., preferably at least 300 mPa·s, and may have a viscosity of up to 90000 mPa·s, preferably up to 70000 mPa·s. Most preferably the polyorganosiloxane (A) comprises at least one α,ω-vinyldimethylsiloxy polydimethylsiloxane having a viscosity of from 100 to 90000 mPa·s at 25° C. The polyorganosiloxane (A) can for example comprise a first α,ω-vinyldimethylsiloxy polydimethylsiloxane having a viscosity at 25° C. of from 50 to 650 mPa·s and a second am-vinyldimethylsiloxy polydimethylsiloxane having a viscosity at 25° C. of 10,000 to 90000 mPa·s as described in U.S. Pat. No. 6,709,752 (henceforth throughout all viscosities are measured at 25° C. unless otherwise indicated and unless otherwise indicated viscosity measurements were made using a Brookfield® viscometer with spindle 7 at 10 rpm).

The organopolysiloxane (A) may additionally include an oligomeric organopolysiloxane containing Si-bonded methyl and vinyl groups, for example an oligomeric organopolysiloxane containing silanol end groups. We have found that such an oligomeric organopolysiloxane may enhance the air tightness of coatings formed according to the invention, particularly if the oligomeric organopolysiloxane is used to pre-treat the reinforcing filler present in the composition.

The oligomeric organopolysiloxane can for example be a methylvinylpolysiloxane in which both molecular terminals are dimethylhydroxysiloxy units, or a copolymer of a methylvinyl siloxane and dimethylsiloxane units in which both molecular terminals are dimethylhydroxysiloxy units. The oligomeric organopolysiloxane can be a mixture of organopolysiloxane molecules, some of which have silanol end groups at both molecular terminals and some of which have only one silanol group such as a dimethylhydroxysiloxy terminal unit with the other terminal unit being for example a dimethylmethoxysiloxy unit, a trimethylsiloxy unit or a dimethylvinylsiloxy unit. Preferably more than 50% by weight of the oligomeric organopolysiloxane, more preferably 60-100% comprises molecules having silanol end groups at both molecular terminals.

The oligomeric organopolysiloxane preferably contains at least 3%, more preferably at least 5%, by weight vinyl groups, and can contain up to 35 or 40% by weight vinyl groups. Most preferably the oligomeric organopolysiloxane contains 5 to 30% by weight vinyl groups. The oligomeric organopolysiloxane preferably has a molecular weight of 1000 to 10000. The oligomeric organopolysiloxane preferably has a viscosity not exceeding 50 mPa·s, more preferably a viscosity of 0.1 to 40 mPa·s, and most preferably 1 to 40 mPa·s. (measured at 25° C.). The oligomeric organopolysiloxane can for example comprise 0.1% to 10% by weight of the total polyorganosiloxane (A) in the coating composition.

Organosilicon cross-linkers for use in the elastomer-forming coating composition according to the invention are preferably selected from silanes, low molecular weight organosilicon resins and short chain organosiloxane polymers. The cross-linker compound has at least 3 silicon-bonded hydrogens per molecule which are capable of reacting with the alkenyl or other aliphatically unsaturated groups of the groups of the polyorganosiloxane (A). Suitable short chain organosiloxane polymers may be linear or cyclic. Preferred organosilicon cross-linkers have the general formula $$R^3R^4{}_2SiO(R^4{}_2SiO)_p(R^4HSiO)_qSiR^4{}_2R^5 \quad \text{or}$$

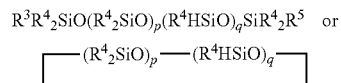

wherein $R^4$ denotes an alkyl or aryl group having up to 10 carbon atoms, $R^3$ is a group $R^4$ or a hydrogen atom, p has a value of from 0 to 20, q has a value of from 1 to 70, and there are at least 3 silicon-bonded hydrogen atoms present per molecule. It is preferred that $R^4$ denotes a lower alkyl group having no more than 3 carbon atoms, most preferably a methyl group. $R^3$ preferably denotes an $R^4$ group. Preferably p=0 and q has a value of from 2 to 70, more preferably 2 to 30, or where cyclic organosilicon materials are used, from 3 to 8. It is most preferred that the organosilicon crosslinker is a siloxane polymer having a viscosity of from 1 to 150 mPa·s at 25° C., more preferably 2 to 100 mPa·s, most preferably 5 to 60 mPa·s. The cross-linking organosilicon compound may comprise a mixture of several materials as described. Examples of suitable organosilicon cross-linkers thus include trimethylsiloxane end-blocked polymethylhydrosiloxanes, dimethylhydrosiloxane end-blocked methylhydro siloxane, dimethylsiloxane methylhydrosiloxane copolymers and tetramethylcyclotetrasiloxane.

The molar ratio of Si—H groups in the organosilicon crosslinker to aliphatically unsaturated groups in the organopolysiloxane (A) is preferably at least 1:1 and can be up to 8:1 or 10:1. Most preferably the molar ratio of Si—H groups to aliphatically unsaturated groups is in the range from 1.5:1 to 5:1.

The catalyst able to promote the reaction of the aliphatically unsaturated hydrocarbon or hydrocarbonoxy substituents of organopolysiloxane (A) with the Si—H groups of the organosilicon crosslinker is preferably a platinum group metal (Group VIII of the Periodic Table) or a compound thereof. Platinum and/or platinum compounds are preferred, for example finely powdered platinum; a chloroplatinic acid or an alcohol solution of a chloroplatinic acid; an olefin complex of a chloroplatinic acid; a complex of a chloroplatinic acid and an alkenylsiloxane; a platinum-diketone complex; metallic platinum on silica, alumina, carbon or a similar carrier; or a thermoplastic resin powder that contains a platinum compound. Catalysts based on other platinum group metals can be exemplified by rhodium, ruthenium, iridium, or palladium compounds. For example, these catalysts can be represented by the following formulas:

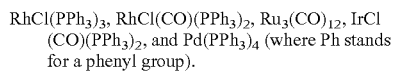

$RhCl(PPh_3)_3$, $RhCl(CO)(PPh_3)_2$, $Ru_3(CO)_{12}$, $IrCl(CO)(PPh_3)_2$, and $Pd(PPh_3)_4$ (where Ph stands for a phenyl group).

The catalyst is preferably used in an amount of 0.5 to 100 parts per million by weight platinum group metal based on the polyorganosiloxane (A), more preferably 1 to 50 parts per million.

The coating composition may contain an additional catalyst, for example a titanium compound such as tetra(isopropoxy)titanium (TiPT).

The reinforcing filler present in the coating composition is preferably a reinforcing silica filler, for example fumed (pyrogenic) silica, such as that sold by Cabot under the trade mark Cab-O-Sil MS-75, precipitated silica or gel-formation silica. The specific surface area of this reinforcing silica filler is preferably at least 50 $m^2/g$.

The silica filler generally comprises at least 1% by weight of the whole coating composition and can for example be present at up to 40% by weight of the coating composition. Preferably the silica filler is present at 2 to 30% by weight of the coating composition.

When preparing the coating composition of the invention, the filler is optionally mixed with part of the aliphatically unsaturated hydrocarbon or hydrocarbonoxy substituted organopolysiloxane (A) to form a masterbatch which can then be mixed with the other ingredients of the coating composition, including further aliphatically unsaturated hydrocarbon or hydrocarbonoxy substituted organopolysiloxane (A). The masterbatch may for example contain 5 to 50% by weight of the total polyorganosiloxane (A) used in the elastomer-forming coating composition. The branched organopolysiloxane (A1) can be present in the organopolysiloxane (A) used to form the masterbatch and/or in the organopolysiloxane (A) which is subsequently mixed with the masterbatch.

if the coating composition contains an oligomeric organopolysiloxane containing Si-bonded methyl and vinyl groups and silanol end groups, the filler is preferably pre-treated with this oligomeric organopolysiloxane either separately or in forming a masterbatch before the filler is mixed with the major part of the coating composition. A silica filler can for example be mixed with the oligomeric organopolysiloxane containing Si-bonded methyl and vinyl groups and silanol end groups in the absence of any other organopolysiloxane. A small amount (generally no more than 25% by weight of the whole mixture) of water, organic solvent and/or a coupling agent adapted to improve the adhesion of the oligomeric organopolysiloxane to the silica filler can be present during the mixing step. The coupling agent can for example be a silazane such as hexamethyldisilazane or tetramethyldisilazane. The treated filler can then be mixed with the other ingredients of the coating composition. Alternatively the oligomeric organopolysiloxane can form part of the organopolysiloxane (A) used to form a filler masterbatch.

The elastomer-forming coating composition may be prepared by merely mixing the ingredients in the desired ratios. However, for reasons of storage stability and bath life before or during application of the composition to the textile fabric, it is usually preferred to store the composition in two parts, by separating the catalyst from the organosilicon cross-linker. The other components of the composition, including the filler masterbatch or the optionally treated silica filler, can be in either part of the composition but are preferably distributed over both parts in proportions which will allow easy mixing of the two parts immediately prior to application. Such easy mixing ratios may be e.g. 1/10 or 1/1 ratios.

Other additional components may be included in the coating compositions of the invention, including for example adhesion promoters, other fillers, dyes, pigments, viscosity modifiers, bath-life extenders, inhibitors and/or flexibilisers.

Use of an adhesion promoter may be desired to impart to the composition better adhesion to fabrics such as woven nylon or polyester fabric commonly used as airbag base fabric and to enhance continued adhesion of the coating to the fabric even after long-term exposure of the fabric to conditions of high temperature and high humidity. Suitable adhesion promoters include zirconium chelate compounds and epoxy-functional or amino-functional organosilicon compounds. Suitable zirconium chelate compounds known in the art include the following examples: zirconium (IV) tetraacetyl acetonate, zirconium (IV) hexafluoroacetyl acetonate, zirconium (IV) trifluoroacetyl acetonate, tetrakis(ethyltrifluoroacetyl acetonate) zirconium, tetrakis (2,2,6,6-tetramethylheptanethionate) zirconium, zirconium (IV) dibutoxy bis (ethylacetonate), diisopropoxy bis(2,2,6,6-tetramethylheptanethionate) zirconium, or similar zirconium complexes having β-diketones (including alkyl-substituted and fluoro-substituted forms thereof) which are used as ligands. Most preferable of these compounds are zirconium complexes of acetoacetate (including alkyl-substituted and fluoro-substituted forms). Such a zirconium chelate compound can be used in conjunction with an epoxy-containing alkoxysilane, for example 3-glycidoxypropyl trimethoxysilane, 3-glycidoxypropyl triethoxysilane, 3-glycidoxypropyl methyldimethoxysilane, 4-glycidoxybutyl trimethoxysilane, 5,6-epoxyhexyl triethoxysilane, 2-(3,4-epoxycyclohexyl)ethyltrimethoxysilane, or 2-(3,4-epoxycyclohexyl)ethyltriethoxysilane.

Other fillers, if used, can include ground quartz, ground cured silicone rubber particles and calcium carbonate. Such other fillers are preferably present at a lower level than the reinforcing silica filler. Preferably these other fillers have been treated to make their surface hydrophobic. If other fillers are used, they can advantageously be treated with the oligomeric organopolysiloxane together with the silica filler.

Examples of suitable inhibitors include ethylenically or aromatically unsaturated amides, acetylenic compounds, ethylenically unsaturated isocyanates, olefinic siloxanes, unsaturated hydrocarbon diesters, conjugated ene-ynes, hydroperoxides, nitriles and diaziridines. Specific examples include methylbutynol, dimethylhexynol or ethynylcyclohexanol, trimethyl(3,5-dimethyl-1-hexyn-3-oxy)silane, a maleate, for example bis(2-methoxy-1-methylethyl)maleate or diallyl maleate, a fumarate e.g. diethylfumarate or a fumarate/alcohol mixture wherein the alcohol is, for example, benzyl alcohol or 1-octanol and ethenylcyclohexan-1-ol. If used, an inhibitor can for example be used at 0.1 to 3% by weight of the release coating composition.

The invention includes a process for coating a fabric with the coating composition of the invention. The fabric is preferably a woven fabric, particularly a plain weave fabric, but can for example be a knitted or nonwoven fabric. The fabric may be made from synthetic fibres or blends of natural and synthetic fibres, for example polyamide fibres such as nylon-6,6, polyester, polyimide, polyethylene, polypropylene, polyester-cotton, or glass fibres. For use as air bag fabric, the fabric should be sufficiently flexible to be able to be folded into relatively small volumes, but also sufficiently strong to withstand deployment at high speed, e.g. under the influence of an explosive charge. The coating compositions of the invention have good adhesion to plain weave nylon fabrics, which are generally difficult to adhere to. The coating compositions of the invention have particularly good adhesion and film forming properties immediately on contacting the fabric, so that film formation on the surface of the fabric being coated is uniform and for one piece woven air bag coating, the film at the cushion to seam interface is maintained during the coating process. The coating compositions of the invention also have good penetration into the fabric. Coated fabrics according to the invention have reduced gas permeability. Coated air bags according to the invention have improved air tightness, particularly one piece woven air bags which have been coated according to the invention and also air bags made from cut and sewn fabric coated according to the invention.

The coating composition of the invention can be applied according to known techniques to the fabric substrate. These include spraying, gravure coating, bar coating, coating by knife-over-roller, coating by knife-over-air, padding, dipping and screen-printing. It is preferred that the composition is applied by a knife-over-air or knife-over-roller coating method. The coating composition can be applied to an air bag fabric which is to be cut into pieces and sewn to assemble an air bag, or to a one piece woven air bag. The coating composition is generally applied at a coat-weight of at least 10 g/m$^2$ and preferably at least 15 g/m$^2$, and may be applied at up to 100 or 150 g/m$^2$. The coating composition of the invention has particular advantage in achieving adequate air tightness of the air bag when applied at low coat weight, that is below 50 g/m$^2$, for example in the range 15 to 40 g/m$^2$.

Although it is not preferred, it is possible to apply the composition in multiple layers, which together have the coat weights set out above. It is also possible to apply onto the coating composition a further coating, e.g. of a material providing low friction, or a coating having a similar composition to the coating of the invention but without the branched organopolysiloxane (A).

The coatings of the invention are capable of curing at ambient temperature over prolonged periods, but the preferred curing conditions for the coating are at elevated temperatures over a period which will vary depending on the actual temperature used, for example 120 to 200° C. for a period of 5 seconds to 5 minutes.

The following examples, where parts and percentages are given in weight unless otherwise stated and where viscosity is measured at 25° C., illustrate the invention. Unless otherwise indicated viscosity measurements were made using a Brookfield® viscometer with spindle 7 at 10 rpm. Vinyl group content was measured by Infrared spectroscopy using standards of the carbon double bond stretch. Molecular weight values were determined using gel permeation chromatography.

EXAMPLE 1

A branched polysiloxane (as described in general terms as A1 above) was formed by reacting 208.33 grains (1 mole) tetraethyl orthosilicate with 186.40 grams (1 mole) divinyltetramethyldisiloxane in the presence of 0.08 grams (0.0005 mol) of trifluoromethane sulfonic acid followed by addition of 36.93 grams (2.05 moles) of H$_2$O. 2.73 parts of this branched polysiloxane was reacted with 297.3 parts decamethylcyclopentasiloxane in the presence of 0.005 parts of a trimethyl amine hydroxide phosphazene base catalyst, 0.03 parts potassium silanolate of equivalent weight per potassium of 10,000 and 0.009 parts tris(trimethylsilyl)phosphate. A branched polysiloxane A1a was produced having 0.17% vinyl content, viscosity 21600 mPa·s and weight average molecular weight Mw 53,100.

363 g of the branched polysiloxane A1a was charged to a Baker Perkins mixer with 15.0 g water and 81.0 g of a copolymer ViO1 of methylvinylsiloxane and dimethylsiloxane units that has a viscosity of 20 mPa·s and is capped at both molecular terminals with dimethylvinylsiloxy groups. 100 g 'MS-75D' fumed silica was added and mixed for 5 minutes. 44.1 g hexamethyldisilazane was added and mixed for 5 minutes. 159.35 g 'MS-75D' fumed silica was added and mixed for 35 minutes at room temperature, then for 1 hour at 100° C. to form treated filler.

A silicone resin/polyorganosiloxane mix RP1 having a vinyl content of % was prepared by mixing an organopolysiloxane resin of the formula $(Me_3SiO_{1/2})_n(Me_2ViSiO_{1/2})_m(SiO_{4/2})_r$, where $(n+m)/r=0.71$, having number-average molecular weight Mn=4300 and vinyl group content=1.9%, with a dimethylvinylsiloxy-end capped dimethylpolysiloxane SP1 of viscosity of 40,000 mPa·s and vinyl group content 0.09%.

25.65 g of the branched polysiloxane A1a and 711.9 g of the silicone resin/polyorganosiloxane mix RP1 was added to the treated filler and mixed with cooling to form a masterbatch MB1 which could be mixed into both parts of a 2-package silicone rubber coating composition.

A 2-package coating composition was prepared from MB1, RP1, ViO1 and the following ingredients:
INT:
Platinum catalyst: a 1,3-divinyltetramethyldisiloxane solution of a platinum complex of 1,3divinyltetramethyldisiloxane, having a Pt content of 0.40%
TiPT Catalyst:
Crosslinker: a copolymer of methylhydrogensiloxane and dimethylsiloxane units of viscosity 5.5 mPa·s capped at both molecular terminals with trimethylsiloxy groups; content of silicon-bonded hydrogen atoms is about 0.73 mass %
Silane S1: 3-methacryloxypropyltrimethoxysilane
Silane S2: 3-glycidoxypropyltrimethoxysilane
Inhibitor 1: ethynylcyclohexanol.

The formulation of each of the parts of the coating composition is shown in Table 1

TABLE 1

|  | Part A - weight % | Part B - weight % |
| --- | --- | --- |
| MB1 | 34.39 | 29.77 |
| RP1 | 63.77 | 46.61 |
| INT | 0.48 |  |
| Platinum catalyst | 0.58 |  |
| TiPT catalyst | 0.78 |  |
| Crosslinker |  | 20.85 |
| ViO1 |  | 0.36 |
| Silane S1 |  | 0.96 |
| Silane S2 |  | 1.42 |
| Inhibitor 1 |  | 0.03 |

48.6% Part A. 48.6% Part B and 2.8% red pigment were mixed in a Hauschild dental mixer for 20 seconds. The resulting coating composition was applied to a 46×46 plain weave 420 denier nylon fabric in a knife over air coater at various coat weights. The coater had a forced air heating oven in which the dwell time of the coated fabric was 50 seconds at 193° C.

In a comparative example C1, Example 1 was repeated replacing the branched polysiloxane A1a by the silicone resin/polyorganosiloxane mix RP1.

Samples of the coated fabrics of each of Example 1 and comparative example C1 of different coat weights were tested for permeability to high pressure air in a test in which samples of the coated fabric were clamped between metal plates having aligned 56 mm diameter circular apertures. The coated face of the fabric was in a chamber which could be pressurized; this chamber was pressurized to 200 kPa air pressure then the air feed was shut. The other face of the fabric was open to atmospheric pressure. The rate at which pressure in the chamber fell was monitored electronically. The pressure after 30 seconds is recorded in Table 2. The coat weight was determined by measuring the weight of uncoated samples of material of a specific area and then measuring the weight of coated samples having the same area and determining the weight difference between the two samples.

A control sample C2 of a commercially available silicone rubber air bag coating applied to the same fabric at its intended coat weight of 35 g/m² was also tested. A comparison sample C3 of a commercially available coated air bag fabric was also tested and recorded in Table 2.

TABLE 2

| Example | Coat weight (g/m²) | Pressure after 30 seconds in kPa |
| --- | --- | --- |
| C1 | 20 | 188 |
| 1 | 20 | 197 |
| C1 | 25 | 193 |
| 1 | 26 | 198 |
| C1 | 31 | 197 |
| 1 | 30 | 198 |
| C1 | 35 | 198 |
| 1 | 35 | 197 |
| C2 | 35 | 198 |
| C3 |  | 180 |

It can be seen from Table 2 that the presence of the branched vinyl-functional polysiloxane A1a gave a substantial reduction in air permeability, or advantage in air pressure retention, at low coat weights. The advantage is particularly marked at 20 g/m² and is also shown at 26 g/m²

Samples of the coating compositions of each of Example 1 and comparative example C1 were used to coat 54 liter one piece woven cushion air bags at a coating weight of 75 g/m². The air bags were slowly inflated to 70 kPa, the air valves were closed and the pressure inside the air bag was electronically monitored over 12 seconds using a Rosemount Pressure transmitter Model 3051 TG calibrated over a pressure range of from 0 to 300 kPa. The results are shown in Table 3.

TABLE 3

| Seconds | Pressure (kPa) Example 1 | Pressure (kPa) Example C1 |
| --- | --- | --- |
| 0 | 71.2 | 71.3 |
| 1 | 69.7 | 67.6 |
| 2 | 68.0 | 64.2 |
| 3 | 66.5 | 60.9 |
| 4 | 65.2 | 58.1 |
| 5 | 64.0 | 55.2 |
| 6 | 62.6 | 52.6 |
| 7 | 61.1 | 50.0 |
| 8 | 60.4 | 47.8 |
| 9 | 59.2 | 45.6 |
| 10 | 58.0 | 43.1 |

TABLE 3-continued

| Seconds | Pressure (kPa) Example 1 | Pressure (kPa) Example C1 |
| --- | --- | --- |
| 11 | 57.0 | 41.5 |
| 12 | 56.3 | 39.9 |

It can be seen from Table 3 that air bags coated with the composition of Example 1 containing the branched vinyl-functional polysiloxane A1a retained pressure significantly better than air bags coated with the composition of Example C1.

EXAMPLE 2

A two component coating composition was prepared from polysiloxane SP1, branched polysiloxane A1a, silanol-terminated oligomer ViO1, Platinum catalyst, Crosslinker, Silane 1, Silane 2, Inhibitor 1 and the following materials in the amounts shown in Table 4:

Filler 2—hexamethyldisilazane treated silica
TMTV—tetramethyltetravinylcyclotetrasiloxane
Adhesion promoter—zirconium tetrakisacetylacetonate
TMDV—tetramethyldivinyldisiloxane
Inhibitor 2—3,5-dimethyl-1-hexynol

TABLE 4

|  | Part 1 (parts by weight) | Part 2 (parts by weight) |
| --- | --- | --- |
| SP1 | 78.0 | 74.0 |
| A1a | 1.0 | 1.0 |
| Filler 2 | 20.0 | 20.0 |
| TMTV | 0.40 |  |
| Adhesion promoter | 0.20 |  |
| ViO1 | 0.06 | 0.29 |
| Platinum catalyst | 0.06 |  |
| Crosslinker |  | 3.0 |
| Silane 2 |  | 1.10 |
| Silane 1 |  | 0.90 |
| Inhibitor 2 |  | 0.08 |
| Inhibitor 1 |  | 0.02 |

Parts 1 and 2 were packaged separately and were mixed just before application by knife over air coater to a 5.4 liter one piece woven side curtain air bag at 59 g/m².

In a comparative example C4, a similar 2-component silicone rubber coating composition was prepared by replacing the branched organopolysiloxane A1a by the dimethylvinylsiloxy-end capped dimethylpolysiloxane SP1 and was mixed and applied to the curtain air bag at 58 g/m².

A further comparison was made with a commercial silicone rubber air bag coating C5 applied to the curtain air bag at 59 g/m².

The curtain air bags coated with the coatings of Example 2, C4 and C5 were tested in a dynamic pressure retention test in which a 10 litre tank is pressurized to about 165 kPa and is opened instantaneously into the bag. The pressure in the bag is tracked over a period of 10 seconds after pressure release. The results are shown in Table 5.

TABLE 5

| Seconds | Pressure (kPa) Example 2 | Pressure (kPa) Example C4 | Pressure (kPa) Example C5 |
| --- | --- | --- | --- |
| 0 | 169 | 162 | 161 |
| 1 | 163 | 152 | 150 |
| 2 | 151 | 135 | 133 |
| 3 | 121 | 88 | 83 |
| 4 | 94.6 | 51.8 | 47.1 |

TABLE 5-continued

| Seconds | Pressure (kPa) Example 2 | Pressure (kPa) Example C4 | Pressure (kPa) Example C5 |
|---|---|---|---|
| 5 | 74.0 | 28.9 | 26.4 |
| 6 | 57.7 | 15.4 | 14.8 |
| 7 | 44.6 | 7.6 | 8.1 |
| 8 | 33.7 | 4.1 | 4.4 |
| 9 | 25.0 | 2.4 | 2.6 |
| 10 | 18.2 | 1.6 | 1.7 |

It can be seen from Table 5 that the air bag coated with the coating of Example 2 retained pressure significantly longer than the air bags coated with C4 and C5.

EXAMPLE 3

The composition of example 2 was utilised as the basis of a series of compositions wherein the only difference was the amount of the branched vinyl-functional polysiloxane A1a present, and comparative C6 was used in which no branched vinyl-functional polysiloxane A1a was present (the values in Table 6 replacing the 1 part by weight in each of part A and part B in Table 4 above, i.e. in example 3, 1.2 parts by weight are individually present in part A and part B).

TABLE 6

| Example | Amount of A1a present (parts by weight) |
|---|---|
| C6 | 0 |
| 3 | 1.2 |
| 4 | 2.0 |
| 5 | 2.5 |
| 6 | 4.0 |

It is believed that this improvement is caused by the surprising improved rheology of the composition at the time of coating which can be understood in terms of the shear recovery depicted in the graph shown as FIG. 1 herein. Shear recovery (sometimes referred to as "stress sweep") is a measure of the time taken after shear for the shear stress to return to its original unsheared state, i.e. G' in FIG. 1 is the elastic modulus of the silicone at 1 Hz and recovery of the silicone to its unsheared state. All shear stress measurements were carried out using a parallel plate process using an Ares 2000X apparatus. Good seam coverage is achieved using the composition as herein described because the composition itself has a high enough viscosity to establish a suitable film across the interface, such that if using a blade coater as the blade coater good coverage is achieved when coating the fabric seam. This is because the composition has good thinning characteristics with the high viscosity material used shear thinning to enable coating. What is perhaps more important is that the shear recovery is sufficiently slow so that once the composition has been shear thinned it is relatively stable and does not immediately return to its original viscosity.

FIG. 2a herein depicts the coverage on the textile surface of the composition of C6 with a coat weight of 60 gm². It will be noted that the depth of the coat is poor and in places almost non-existent. The applicants believe that the viscosity of the composition of C6 results is too high for good coverage. In comparison FIG. 2b depicts the same composition with the exception that A1a is present again with a coat weight of 60 gm² It will be seen that a much thicker coating remains on the surface of the textile indicating an improved rheology of the composition when applied in comparison with C6.

The invention claimed is:

1. An air bag coated with an elastomeric coating which is the cured product of a silicone composition comprising an organopolysiloxane (A) having aliphatically unsaturated hydrocarbon or hydrocarbonoxy substituents, an organosilicon crosslinker having at least 3 silicon-bonded hydrogen atoms, a catalyst able to promote the reaction of the aliphatically unsaturated hydrocarbon or hydrocarbonoxy substituents with Si—H groups, and a reinforcing filler, wherein the organopolysiloxane (A) comprises a branched organopolysiloxane (A1) comprising:
   (i) one or more Q units of the formula $(SiO_{4/2})$, and
   (ii) from 15 to 8000 D units of the formula $R^b{}_2SiO_{2/2}$ which units (i) and (ii) may be inter-linked in any appropriate combination, and
   (iii) M units of the formula $R^a R^b{}_2 SiO_{1/2}$, wherein each $R^a$ substituent is selected from the group consisting of an alkyl group having from 1 to 6 carbon atoms, an alkenyl group having from 1 to 6 carbon atoms, and an alkynyl group having from 1 to 6 carbon atoms, at least three $R^a$ substituents in the branched siloxane being alkenyl or alkynyl units, and each $R^b$ substituent is selected from the group consisting of an alkyl group having from 1 to 6 carbon atoms, an alkenyl group having 2 to 6 carbon atoms, an aryl group, an alkoxy group, an acrylate group, and a methacrylate group.

2. A coated air bag according to claim 1 wherein each $R^a$ substituent is an alkenyl group selected from vinyl and hexenyl groups.

3. A coated air bag according to claim 1 wherein the branched organopolysiloxane (A1) comprises a polymerization product of a siloxane, having units of the chemical formula $(SiO_{4/2})(R^a R^b{}_2 SiO_{1/2})_x$, and a cyclic polysiloxane.

4. A coated air bag according to claim 1 wherein the polyorganosiloxane (A) also comprises an α,ω-vinyldimethylsiloxy polydimethylsiloxane having a viscosity of from 50 to 70000 mPa·s at 25° C.

5. A coated air bag according to claim 1 wherein the branched organopolysiloxane (A1) comprises 0.2 to 50% by weight of the organopolysiloxane (A).

6. A coated air bag according to claim 5 wherein each $R^a$ substituent is an alkenyl group selected from vinyl and hexenyl groups.

7. A coated air bag according to claim 5 wherein the branched organopolysiloxane (A1) comprises a polymerization product of a siloxane, having units of the chemical formula $(SiO_{4/2})(R^a R^b{}_2 SiO_{1/2})_x$, and a cyclic polysiloxane.

8. A coated air bag according to claim 1 wherein the branched organopolysiloxane (A1) has the general formula:

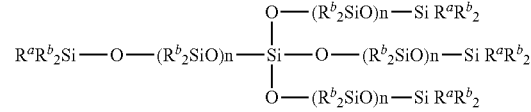

where each n is independently from 1 to 1600, at least 50% of $R^a$ substituents being alkenyl groups.

9. A coated air bag according to claim 8 wherein each $R^a$ substituent is an alkenyl group selected from vinyl and hexenyl groups.

10. A coated air bag according to claim 1 wherein the reinforcing filler comprises hydrophobic silica and is present in the silicone composition at 10 to 80% by weight based on the polyorganosiloxane (A).

11. A coated air bag according to claim 10 wherein the silica is surface treated with an oligomeric organopolysiloxane containing Si-bonded methyl and vinyl groups and silanol end groups.

12. An air bag fabric coated with a silicone composition curable to an elastomeric finish in which the silicone composition comprises an organopolysiloxane (A) having aliphatically unsaturated hydrocarbon or hydrocarbonoxy substituents, an organosilicon crosslinker having at least 3 silicon-bonded hydrogen atoms, a catalyst able to promote the reaction of the aliphatically unsaturated hydrocarbon or hydrocarbonoxy substituents with Si—H groups, and a reinforcing filler, wherein the organopolysiloxane (A) comprises a branched organopolysiloxane (A1) comprising:
  (i) one or more Q units of the formula ($SiO_{4/2}$), and
  (ii) from 15 to 6000 D units of the formula $R^b{}_2SiO_{2/2}$
    which units (i) and (ii) may be inter-linked in any appropriate combination, and
  (iii) M units of the formula $R^aR^b{}_2SiO_{1/2}$, wherein each $R^a$ substituent is selected from the group consisting of an alkyl group having from 1 to 6 carbon atoms, an alkenyl group having from 1 to 6 carbon atoms, and an alkynyl group having from 1 to 6 carbon atoms, at least three $R^a$ substituents in the branched siloxane being alkenyl or alkynyl units, and each $R^b$ substituent is selected from the group consisting of an alkyl group having from 1 to 6 carbon atoms, an alkenyl group having 2 to 6 carbon atoms, an aryl group, an alkoxy group, an acrylate group, and a methacrylate group.

13. An air bag fabric according to claim 12 wherein the molar ratio of Si—H groups in the organosilicon crosslinker to aliphatically unsaturated groups in the organopolysiloxane (A) is from 5:1 to 10:1.

14. An air bag fabric according to claim 12 wherein the silicone composition is present at a coating weight of 15 to 40 g/m².

15. A process for coating an air bag fabric with a silicone composition curable to an elastomeric finish in which the silicone composition comprises an organopolysiloxane (A) having aliphatically unsaturated hydrocarbon or hydrocarbonoxy substituents, an organosilicon crosslinker having at least 3 silicon-bonded hydrogen atoms, a catalyst able to promote the reaction of the aliphatically unsaturated hydrocarbon or hydrocarbonoxy substituents with Si—H groups, and a reinforcing filler, wherein the organopolysiloxane (A) comprises a branched organopolysiloxane (A1) comprising:
  (i) one or more Q units of the formula ($SiO_{4/2}$), and
  (ii) from 15 to 6000 D units of the formula $R^b{}_2SiO_{2/2}$
    which units (i) and (ii) may be inter-linked in any appropriate combination, and
  (iii) M units of the formula $R^aR^b{}_2SiO_{1/2}$, wherein each $R^a$ substituent is selected from the group consisting of an alkyl group having from 1 to 6 carbon atoms, an alkenyl group having from 1 to 6 carbon atoms, and an alkynyl group having from 1 to 6 carbon atoms, at least three $R^a$ substituents in the branched siloxane being alkenyl or alkynyl units, and each $R^b$ substituent is selected from the group consisting of an alkyl group having from 1 to 6 carbon atoms, an alkenyl group having 2 to 6 carbon atoms, an aryl group, an alkoxy group, an acrylate group, and a methacrylate group.

16. A process according to claim 15, wherein the fabric coated with the silicone composition is overcoated with a second silicone rubber coating composition.

17. A process for coating an air bag with a silicone composition curable to an elastomeric finish in which the silicone composition comprises an organopolysiloxane (A) having aliphatically unsaturated hydrocarbon or hydrocarbonoxy substituents, an organosilicon crosslinker having at least 3 silicon-bonded hydrogen atoms, a catalyst able to promote the reaction of the aliphatically unsaturated hydrocarbon or hydrocarbonoxy substituents with Si—H groups, and a reinforcing filler, wherein the organopolysiloxane (A) comprises a branched organopolysiloxane (A1) comprising:
  (i) one or more Q units of the formula ($SiO_{4/2}$), and
  (ii) from 15 to 6000 D units of the formula $R^b{}_2SiO_{2/2}$
    which units (i) and (ii) may be inter-linked in any appropriate combination, and
  (iii) M units of the formula $R^aR^b{}_2SiO_{1/2}$, wherein each $R^a$ substituent is selected from the group consisting of an alkyl group having from 1 to 6 carbon atoms, an alkenyl group having from 1 to 6 carbon atoms, and an alkynyl group having from 1 to 6 carbon atoms, at least three $R^a$ substituents in the branched siloxane being alkenyl or alkynyl units, and each $R^b$ substituent is selected from the group consisting of an alkyl group having from 1 to 6 carbon atoms, an alkenyl group having 2 to 6 carbon atoms, an aryl group, an alkoxy group, an acrylate group, and a methacrylate group.

* * * * *